(12) United States Patent
Hansen

(10) Patent No.: US 6,433,895 B1
(45) Date of Patent: Aug. 13, 2002

(54) WARM-UP CONTROLLER FOR A SCANNER LIGHT-SOURCE

(75) Inventor: Harold L. Hansen, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 456 days.

(21) Appl. No.: 09/016,245

(22) Filed: Jan. 30, 1998

(51) Int. Cl.[7] .................................................. H04N 1/04
(52) U.S. Cl. ........................................ 358/475; 358/474
(58) Field of Search ................................ 358/475, 474, 358/479, 480, 484, 487; 395/114

(56) References Cited

U.S. PATENT DOCUMENTS

| | | | |
|---|---|---|---|
| 4,267,439 A | 5/1981 | Thomas et al. ............ 235/454 |
| 5,483,353 A | 1/1996 | Kudou ....................... 358/404 |
| 5,636,040 A * | 6/1997 | Tung ......................... 358/475 |
| 5,668,446 A | 9/1997 | Baker ....................... 315/294 |
| 6,316,767 B1 * | 11/2001 | Paxton et al. ............. 250/234 |

FOREIGN PATENT DOCUMENTS

| | | | |
|---|---|---|---|
| GB | 2231231 A | 11/1990 | ............ H02J/7/00 |
| JP | 04113768 A | 4/1992 | ............ H04N/1/04 |

* cited by examiner

Primary Examiner—Jerome Grant, II

(57) ABSTRACT

An apparatus for connecting electrical power to an exposure lamp in a scanner at selected times. By automatically turning a scanner on and off at selected times, such an apparatus provides an apparent reduction in exposure lamp warm-up time, with associated improvement in operator productivity, while minimizing lamp operational life degradation and excessive energy consumption caused by leaving the lamp turned on.

14 Claims, 5 Drawing Sheets

WARM-UP CONTROLLER FOR A SCANNER LIGHT-SOURCE

This application is related to copending application Ser. No. 08/955,820, filed on Oct. 22, 1997, Hewlett-Packard Docket No. 10970633, titled "Anticipatory Warm-Up Apparatus for a Scanner Light-Source".

BACKGROUND OF THE INVENTION

1. Field of the Invention

The present patent document relates generally to optical scanning devices used to translate the contents of printed documents into electronic format, and more particularly to the control of electrical power to such devices.

2. Description of Related Art

Several different types of light sources or lamps have been incorporated into optical scanners in order to illuminate the item being scanned. Among other things, the choice of lamp type and style is often based upon cost, size, lamp life, light intensity, output spectrum, power requirements, and turn-on time. Such lamps include cold cathode fluorescent, hot cathode fluorescent, xenon, and light emitting diode (LED) light sources.

In modern scanner systems, especially for those using the more popular cold cathode fluorescent lamps, the warm-up time for the scanner's light source is relatively long. For greater productivity, the scanner should be immediately available for use at any time. In a practical sense, the only technique by which this objective can be met is to leave the light source turned on all the time. However, if the light-source is on continuously, excessive power consumption and a large reduction in lamp operational life will result. As an example, cold cathode fluorescent lamps have an average lamp life of between 10,000 and 15,000 hours prior to burn-out. If a cold cathode lamp is on for only 1,000 hours per year, the operational life of the lamp is approximately 10 to 15 years, and even at 2,000 hours per year, it is 5 to 7.5 years. However, if on continuously, the operational life of the lamp will be reduced to only 14 to 20 months. Thus, there is a significant need to improve the scanner system so as to have, at least in most cases, the light-source warmed up when needed, while reducing degradation in lamp operational life.

SUMMARY OF THE INVENTION

Representative embodiments of the teachings of the present patent document provide enhanced capabilities not previously available to aid in the immediate availability for scanning of optical scanning systems, while reducing degradation of lamp operational life and controlling energy consumption. These capabilities provide increased productivity for an operator of such systems.

Representative embodiments of the present patent document incorporate a software program and associated circuitry for controlling the times when the scanner's exposure lamp is turned on. In another embodiment, a timing circuit is used instead of the software program for controlling the times that the exposure lamp is on. The potential for a reduction in operator perceived lamp warm-up time thus exists, without requiring that the lamp be on continuously. In fact, the system can be set up such that the scanner is on and warmed-up when the operator arrives at work and is turned off after he leaves for the day. The terms lamp and exposure lamp, as used herein, include not only lamps such as the cold cathode fluorescent, hot cathode fluorescent, and xenon lamps, but also other sources of illumination, such as light emitting diodes (LED's).

Since waiting for the exposure lamp in a scanner system to warm up can be expensive in terms of operator inefficiency, since lamp operational life is reduced in relation to the time the lamp is turned on, since leaving a lamp on continuously consumes increased energy, and since image quality is enhanced by the lamp being fully warmed-up, representative embodiments of the present invention provide needed, enhanced capabilities not previously available. Other aspects and advantages of the representative embodiments of the present invention will become apparent from the following detailed description, taken in conjunction with the accompanying drawings, illustrating by way of example the principles of the invention. The details disclosed in the specification should not be read so as to limit the invention.

BRIEF DESCRIPTION OF THE DRAWINGS

The accompanying drawings provide visual representations which will be used to more fully describe the representative embodiments of the present patent document and which can be used by those skilled in the art to better understand it and its inherent advantages. In the drawings, like reference numerals identify corresponding elements and.

DESCRIPTION OF THE PREFERRED EMBODIMENT

Figure 1:
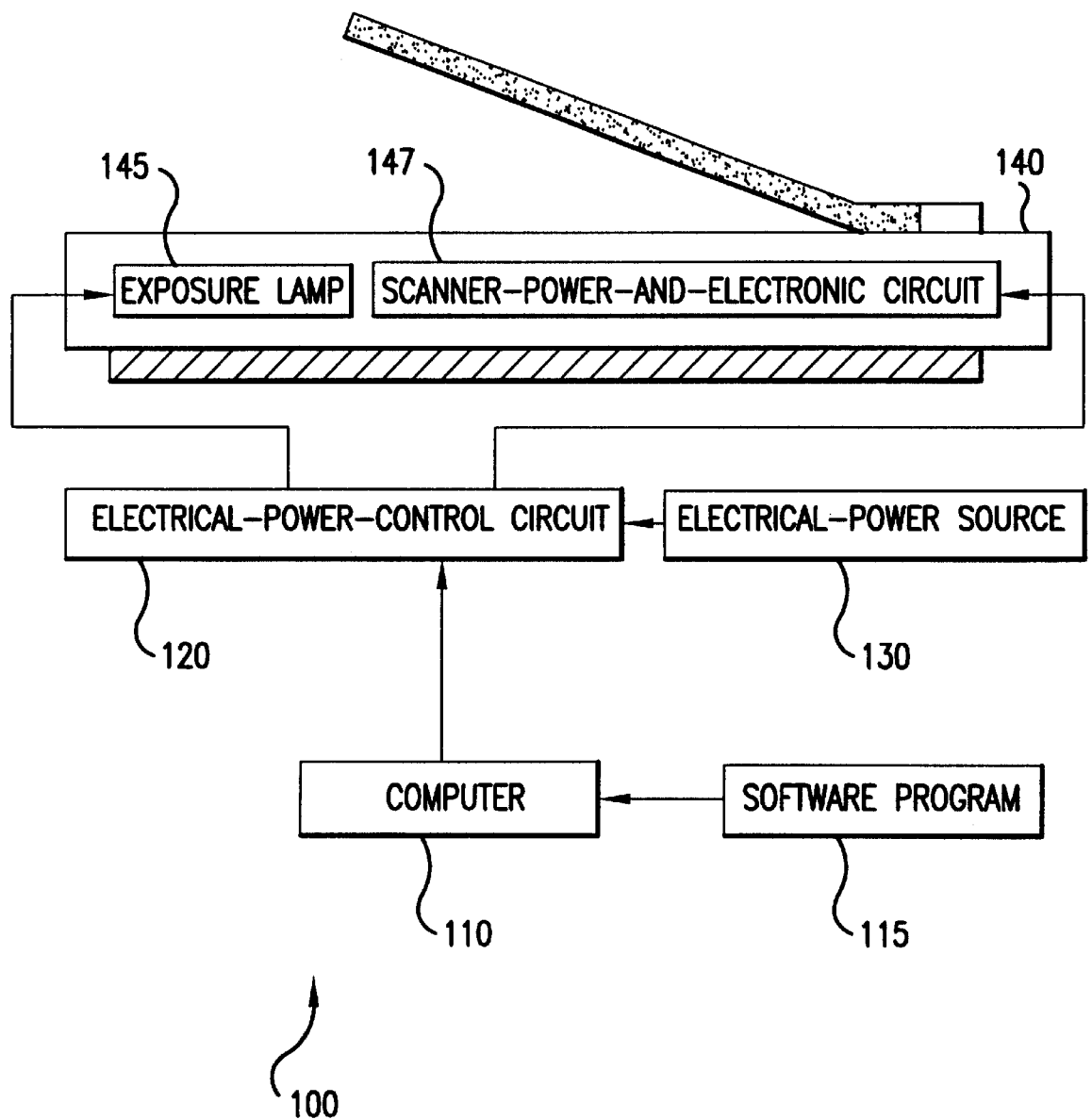
FIG. 1 is a block diagram of a scanner system with a software program and associated electronic circuitry for turning the scanner exposure lamp and scanner electronic circuitry on and off at selected times, the software program running on a computer.

As shown in the drawings for purposes of illustration, the present patent document relates to a novel apparatus for providing an optical scanner which is immediately available for scanning during selected times while reducing lamp operational life degradation. The operator can program the scanner to be warmed-up and ready to scan at a selected time and to turn off at a later selected time. These times could be associated, for example, with the operator's anticipated work arrival and departure times. Previously an operator was forced to either incur excessively long warm-up times or, by leaving the lamp turned-on all the time, to incur significant reductions in lamp operational life with associated increased energy consumption when using optical scanning machines. In the following detailed description and in the figures of the drawings, like elements are identified with like reference numerals.

Referring to FIG. 1, a representative embodiment of the apparatus described in the present patent document is shown wherein a scanner system 100 comprises a computer 110, running a software program 115 and connected electrically to an electrical-power-control circuit 120. At a selected time, the software program directs the electrical-power-control-circuit 120 to connect electrical power from an electrical-power source 130 to an exposure lamp 145 and, in another embodiment, also to a scanner-power-and-electronic circuit 147. Both the exposure lamp 140 and the scanner-power-and-electronic circuit 147 are components of a scanner 140. In another embodiment and at a second selected time, the software program commands the electrical-power-control-circuit 120 to remove electrical power from the electrical-power source 130 from the exposure lamp 145 and, in yet another embodiment, also to remove electrical power from the scanner-power-and-electronic circuit 147. The selected scanner turn-on time could be, for example, determined by the time the operator anticipates arriving at his office. And the selected scanner turn-off time could be determined by the time the operator anticipates leaving his office.

Figure 2:
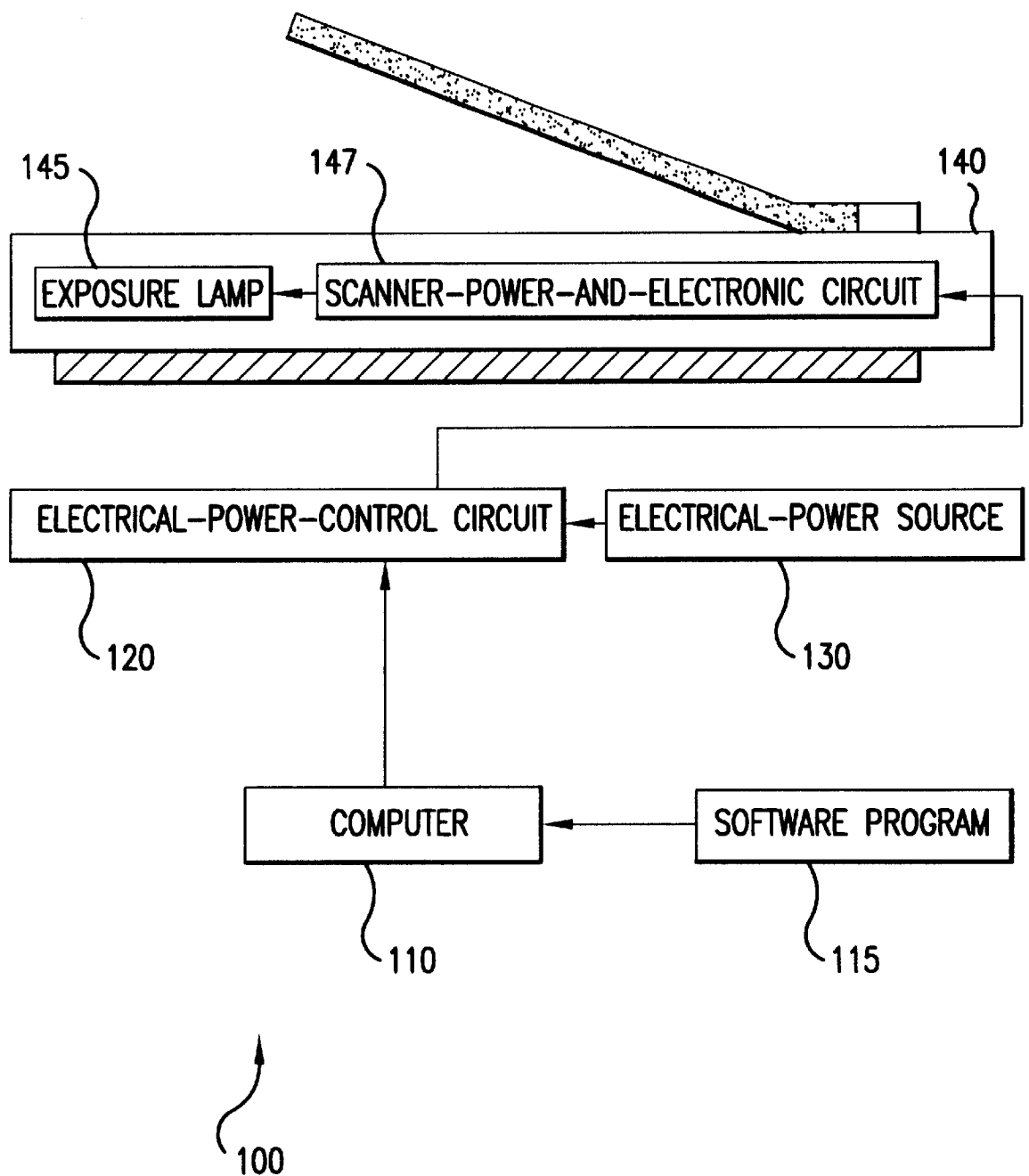
FIG. 2 is a block diagram of a scanner system with a software program and associated electronic circuitry for turning the scanner exposure lamp and scanner electronic circuitry on and off at selected times, the software program running on a computer.

Referring to FIG. 2, another representative embodiment of the apparatus described in the present patent document is shown wherein a scanner system 100 comprises a computer 110, running a software program 115 and connected electrically to an electrical-power-control circuit 120. At a selected time, the software program directs the electrical-power-control-circuit 120 to connect electrical power from an electrical-power source 130 to a scanner-power-and-electronic circuit 147 which in turn connects electrical power to an exposure lamp 145. Both the exposure lamp 140 and the scanner-power-and-electronic circuit 147 are components of a scanner 140. In another embodiment and at a second selected time, the software program commands the electrical-power-control-circuit 120 to remove electrical power from the electrical-power source 130 from the scanner-power-and-electronic circuit 147. The scanner-power-and-electronic circuit 147 in turn removes electrical power from the exposure lamp 145.

Figure 3:
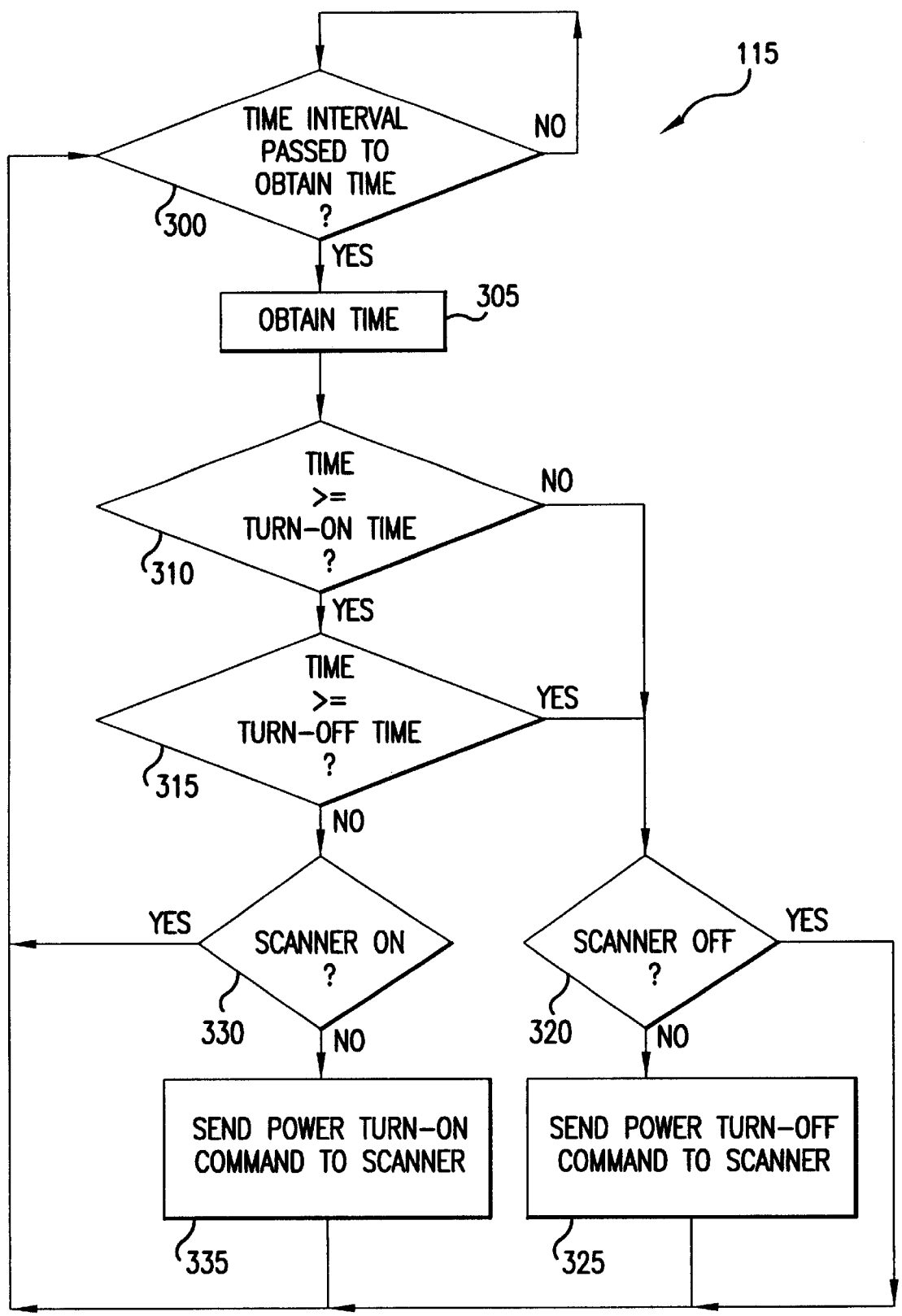
FIG. 3 is a flow chart of a representative embodiment of a computer software program for turning the scanner exposure lamp and associated electronic circuitry on and off at selected times.

FIG. 3 is a flow chart of a representative embodiment of a software program 115 for turning on and off the exposure lamp 140, and in another embodiment the scanner-power-and-electronic circuit 147. In this flow chart, block 300 periodically checks the computer's clock to determine whether or not a selected time interval has passed since the software program 115 last determined whether or not it should send a command to either turn-on or turn-off the scanner. If the selected time interval has passed, block 300 passes control to block 305.

Block 305 obtains the computer clock's time and then passes control to block 310.

Block 310 compares the computer clock's time with the selected time at which the scanner should be turned-on. If the computer clock's time is greater than or equal to the selected time at which the scanner is to be turned-on, control is passed to block 315, otherwise control is passed to block 320.

Block 315 compares the computer clock's time with the selected time at which the scanner should be turned-off. If the computer clock's time is greater than or equal to the selected time at which the scanner is to be turned-off, control is passed to block 320, otherwise control is passed to block 330.

Block 320 determines whether or not the scanner is presently turned-off. If the scanner is presently turned-off, control is transferred to block 300, otherwise control is transferred to block 325.

Block 325 sends a command to turn-off power to the scanner. Block 325 then transfers control to block 300.

Block 330 determines whether or not the scanner is presently turned-on. If the scanner is presently turned-on, control is transferred to block 300, otherwise control is transferred to block 335.

Block 335 sends a command to turn-on power to the scanner. Block 335 then transfers control to block 300.

Figure 4:
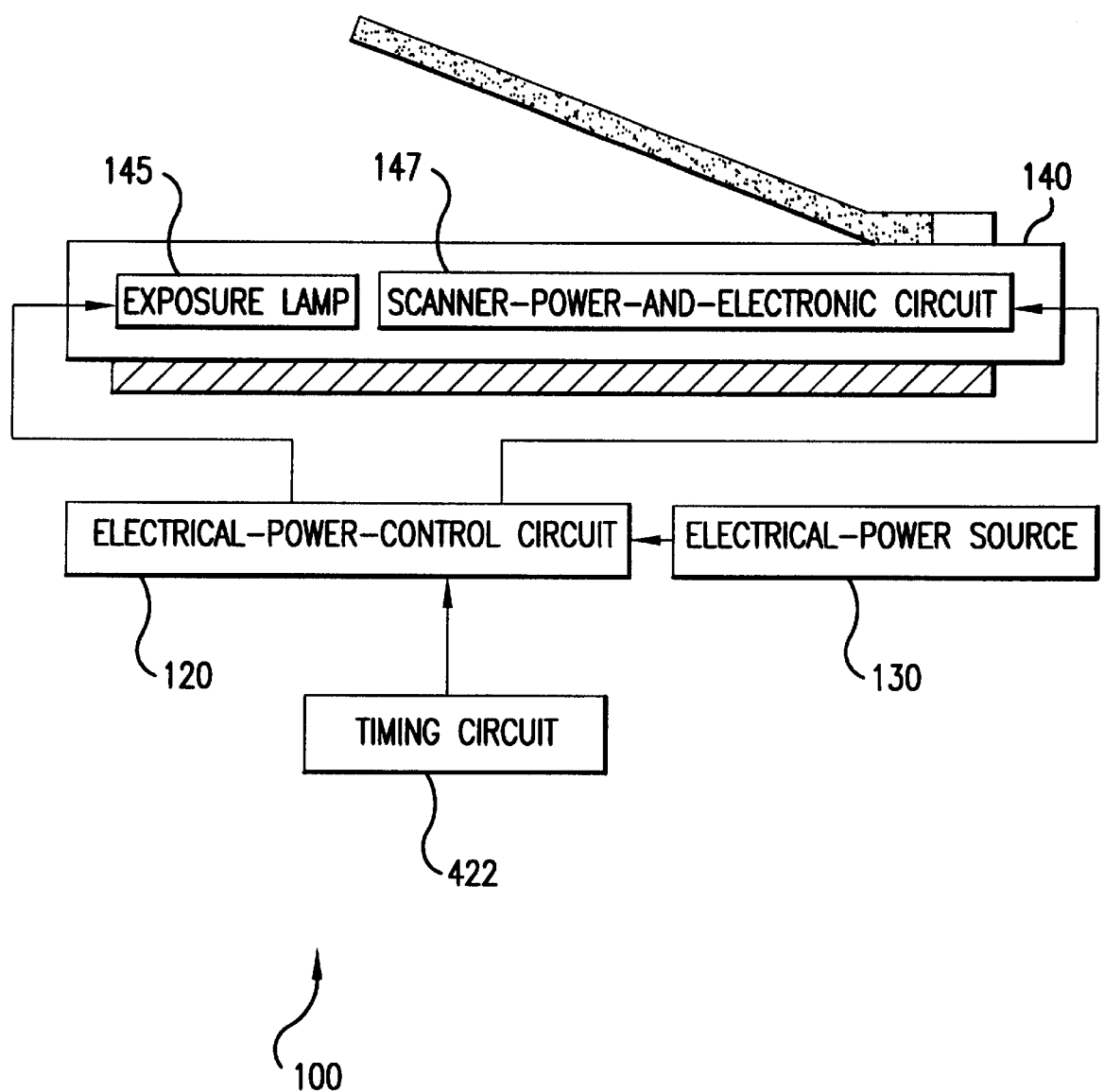
FIG. 4 is a block diagram of a scanner system with a timer circuit and associated electronic circuitry for turning the scanner exposure lamp and scanner electronic circuitry on and off at selected times or intervals.

Referring to FIG. 4, in another representative embodiment, a timing circuit 422 sends signals to an electrical-power-control circuit 120 at selected times or intervals. These signals force the electrical-power-control circuit 120 to connect electrical power from the electrical-power source 130 to the exposure lamp 145, and in another embodiment also to a scanner-power-and-electronic circuit 147.

Figure 5:
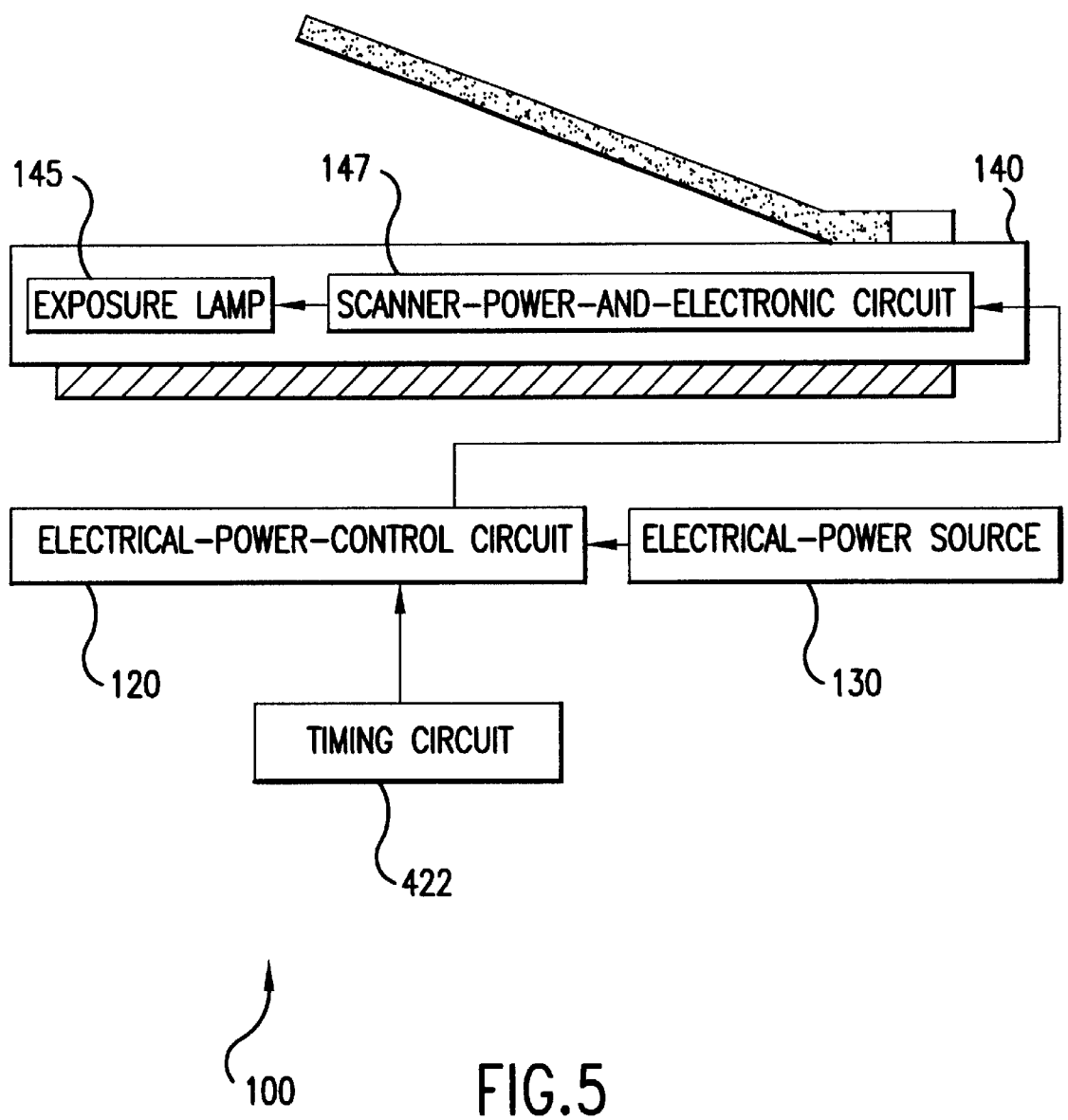
FIG. 5 is a block diagram of a scanner system with a timer circuit and associated electronic circuitry for turning the scanner exposure lamp and scanner electronic circuitry on and off at selected times or intervals.

Referring to FIG. 5, in yet another representative embodiment, a timing circuit 422 sends signals to an electrical-power-control circuit 120 at selected times or intervals. These signals force the electrical-power-control circuit 120 to connect electrical power from an electrical-power source 130 to a scanner-power-and-electronic circuit 147. The scanner-power-and-electronic circuit 147 in turn connects electrical power to an exposure lamp 145.

In practical cases, the electrical-power source 130 is the electric power provided by the wall electrical outlet of the building in which the scanner-system 100 is located.

Embodiments of the present patent document can be used to advantage in scanner systems 100 which use any type of exposure lamp 145 having a non-instantaneous, turn on time. A cold cathode fluorescent lamp is often used in commercial scanning machines and is an example of the type of exposure lamp 145 which would benefit from the advantages of incorporating the techniques such as described in present patent document.

A primary advantage of the embodiments, as described in the present patent document, over previous techniques is the reduction in or the elimination of time that the operator must wait for the exposure lamp to warm-up, while reducing lamp operational life degradation. Also, energy consumption is significantly less than if the scanner lamp is left on continuously. Additionally, if the exposure lamp is fully warmed-up prior to scanning, the quality of the image produced is enhanced. An added advantage is the fact that the above features can be obtained automatically, without operator action. Thus, embodiments of the present patent document solve important problems with loss in operator productivity due to lamp warm-up time, lamp operational life, energy consumption, and image quality in the use of optical scanners.

Although specific embodiments of the invention have been described and illustrated, the invention is not to be limited to the specific forms or arrangements of parts so described and illustrated. The invention is limited only by the claims.

What is claimed is:

1. An apparatus comprising:

a scanner;

an exposure lamp in the scanner;

a computer;

an electrical-power-control circuit connected to the computer, an electrical-power source, and the exposure lamp; and a software program running on the computer, the software program providing instructions to the electrical-powercontrol circuit to connect electrical power from the electrical-power source to the exposure lamp at a preselected time.

2. The apparatus as in claim 1 wherein the exposure lamp is a light source selected from the group consisting of a cold cathode fluorescent lamp, a hot cathode fluorescent lamp, a xenon lamp, and a light emitting diode (LED).

3. An apparatus comprising:

a scanner;

an exposure lamp in the scanner;

a computer;

an electrical-power-control circuit connected to the computer, an electrical-power source, and the exposure lamp; and a software program running on the computer, the software program providing instructions to the electrical-power-control circuit to disconnect electrical power from the electrical-power source to the exposure lamp at a preselected time.

4. The apparatus as in claim 3 wherein the exposure lamp is a light source selected from the group consisting of a cold cathode fluorescent lamp, a hot cathode fluorescent lamp, a xenon lamp, and a light emitting diode (LED).

5. A computer operable method for connecting electrical power to an exposure lamp at a preselected time, comprising the steps of:

obtaining the time; and when the time is greater than or equal to a preselected turn-on time, connecting electrical power to the exposure lamp.

6. A computer operable method for disconnecting electrical power from an exposure lamp at a preselected time, comprising the steps of:

obtaining the time; and when the time is greater than or equal to a preselected turn-off time and the exposure lamp is connected to electrical power, removing electrical power from the exposure lamp.

7. A program storage medium readable by a computer, tangibly embodying a program of instructions executable by the computer to perform method steps for connecting electrical power to an exposure lamp at preselected times, said method steps comprising:

obtaining the time; and when the time is greater than or equal to a preselected turn-on time, connecting electrical power to the exposure lamp.

8. A program storage medium readable by a computer, tangibly embodying a program of instructions executable by the computer to perform method steps for disconnecting electrical power from an exposure lamp at preselected times, said method steps comprising:

obtaining the time; and when the time is greater than or equal to a preselected turn-off time and the exposure lamp is connected to electrical power, removing electrical power from the exposure lamp.

9. An apparatus comprising:

a scanner;

an exposure lamp in the scanner;

a timing circuit; and an electrical-power-control circuit connected to an electrical-power source, the timing circuit, and the exposure lamp.

10. The apparatus as in claim 9 wherein the exposure lamp is a light source selected from the group consisting of a cold cathode fluorescent lamp, a hot cathode fluorescent lamp, a xenon lamp, and a light emitting diode (LED).

11. The apparatus as in claim 9 wherein the timing circuit provides instructions to the electrical-power-control circuit to connect electrical power from the electrical-power source to the exposure lamp at a preselected time.

12. The apparatus as in claim 11 wherein the exposure lamp is a light source selected from the group consisting of a cold cathode fluorescent lamp, a hot cathode fluorescent lamp, a xenon lamp, and a light emitting diode (LED).

13. The apparatus as in claim 9 wherein the timing circuit provides instructions to the electrical-power-control circuit to disconnect electrical power from the electrical-power source to the exposure lamp at a preselected time.

14. The apparatus as in claim 13 wherein the exposure lamp is a light source selected from the group consisting of a cold cathode fluorescent lamp, a hot cathode fluorescent lamp, a xenon lamp, and a light emitting diode (LED).

* * * * *